(12) United States Patent
Xu et al.

(10) Patent No.: US 11,251,652 B2
(45) Date of Patent: Feb. 15, 2022

(54) WIRELESS ENERGY TRANSMISSION METHOD AND DEVICE

(71) Applicant: Beijing Zhigu Rui Tuo Tech Co., Ltd, Beijing (CN)

(72) Inventors: Ran Xu, Beijing (CN); Weicai Huang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 259 days.

(21) Appl. No.: 15/115,660

(22) PCT Filed: Dec. 29, 2014

(86) PCT No.: PCT/CN2014/095252
§ 371 (c)(1),
(2) Date: Jul. 29, 2016

(87) PCT Pub. No.: WO2015/124030
PCT Pub. Date: Aug. 27, 2015

(65) Prior Publication Data
US 2017/0222478 A1    Aug. 3, 2017

(30) Foreign Application Priority Data
Feb. 21, 2014    (CN) .......................... 201410060142.7

(51) Int. Cl.
| | |
|---|---|
| *H02J 50/10* | (2016.01) |
| *H02J 50/50* | (2016.01) |
| *H02J 50/80* | (2016.01) |
| *H02J 7/02* | (2016.01) |
| *H02J 50/00* | (2016.01) |
| *H02J 50/40* | (2016.01) |
| *H02J 50/12* | (2016.01) |

(52) U.S. Cl.
CPC .............. *H02J 50/00* (2016.02); *H02J 7/025* (2013.01); *H02J 50/10* (2016.02); *H02J 50/12* (2016.02);
(Continued)

(58) Field of Classification Search
CPC ............ H02J 5/005; H02J 7/025; H02J 17/00; H02N 2/008; H04B 5/0025–0093;
(Continued)

(56) References Cited

U.S. PATENT DOCUMENTS

| | | | |
|---|---|---|---|
| 2003/0119460 A1* | 6/2003 | Zipper | H04B 17/318 455/115.1 |
| 2006/0056855 A1* | 3/2006 | Nakagawa | G09F 9/33 398/183 |

(Continued)

FOREIGN PATENT DOCUMENTS

| | | |
|---|---|---|
| CN | 1334949 A | 2/2002 |
| CN | 101802942 A | 8/2010 |

(Continued)

OTHER PUBLICATIONS

International Search Report for PCT Application No. PCT/CN2014/095252, dated Mar. 25, 2015, 2 pages.

*Primary Examiner* — Hal Kaplan
*Assistant Examiner* — Thai H Tran
(74) *Attorney, Agent, or Firm* — Amin, Turocy & Watson, LLP

(57) ABSTRACT

Embodiments of the present application provide a wireless energy transmission method and device. A method includes: generating a visible light communication signal according to wireless energy transmission intensity between a wireless energy sending device and a wireless energy receiving device; and sending the visible light communication signal. A signal can be transmitted (or received) related to wireless energy transmission intensity through visible light communication, to enable a user to easily obtain information about wireless energy transmission intensity.

28 Claims, 6 Drawing Sheets

(52) U.S. Cl.
CPC .............. *H02J 50/40* (2016.02); *H02J 50/50* (2016.02); *H02J 50/80* (2016.02)

(58) Field of Classification Search
CPC .................... B60L 5/005; B60L 11/182; B60L 11/1829–1831; Y02T 90/122; H01F 27/006; H01F 27/02; H01F 38/14; H01F 2038/143–146; H01R 13/6633; A61B 1/00029; A61N 1/3787
USPC ........................................... 307/104; 320/108
See application file for complete search history.

(56) References Cited

U.S. PATENT DOCUMENTS

| | | | |
|---|---|---|---|
| 2009/0096413 A1* | 4/2009 | Partovi | .................. H01F 5/003 |
| | | | 320/108 |
| 2010/0181841 A1* | 7/2010 | Azancot | .................. H01F 38/14 |
| | | | 307/104 |
| 2011/0302078 A1* | 12/2011 | Failing | .................. B60L 53/126 |
| | | | 705/39 |
| 2013/0154387 A1 | 6/2013 | Lee et al. | |
| 2013/0200842 A1* | 8/2013 | Takahashi | ............ H04B 5/0037 |
| | | | 320/108 |
| 2014/0239733 A1* | 8/2014 | Mach | ..................... H02J 5/005 |
| | | | 307/104 |

FOREIGN PATENT DOCUMENTS

| | | |
|---|---|---|
| CN | 101971453 A | 2/2011 |
| CN | 202488535 U | 10/2012 |
| CN | 103081276 A | 5/2013 |
| CN | 103812230 A | 5/2014 |
| WO | 2013089485 A1 | 6/2013 |

\* cited by examiner

WIRELESS ENERGY TRANSMISSION METHOD AND DEVICE

RELATED APPLICATION

The present application is a U.S. National Stage filing under 35 U.S.C. § 371 of international patent cooperation treaty (PCT) application No. PCT/CN2014/095252, filed Dec. 29, 2014, and entitled "WIRELESS ENERGY TRANSMISSION METHOD AND DEVICE", which claims the benefit of priority to Chinese Patent Application No. 201410060142.7, filed on Feb. 21, 2014, which applications are hereby incorporated into the present application by reference herein in their respective entireties.

TECHNICAL FIELD

The present application relates to the field of wireless energy transmission, and more particularly, to a wireless energy transmission method and device.

BACKGROUND

During wireless energy transmission, a communication link is generally maintained between a wireless energy sending device and a wireless energy receiving device, which may be constructed based on various existing wireless communication protocols such as Bluetooth, Wi-Fi, and near field communication. The communication link may be used to transmit some useful data information between the wireless energy sending device and the wireless energy receiving device, for example, a current battery level of the wireless energy receiving device, wireless energy transmission intensity between the wireless energy sending device and the wireless energy receiving device.

The useful data information is usually not directly visible to a user, and to learn the information, the user thus first activates the wireless energy sending device or the wireless energy receiving device, and then queries related information. Moreover, establishment of the communication link is used to set corresponding communication units at both ends of the wireless energy sending device and the wireless energy receiving device.

SUMMARY

An example object of the present application is to provide a wireless energy transmission technology.

In an aspect, an example embodiment of the present application provides a wireless energy transmission method, the method including:
generating a visible light communication signal according to wireless energy transmission intensity between a wireless energy sending device and a wireless energy receiving device; and
sending the visible light communication signal.

In another aspect, an example embodiment of the present application provides a wireless energy transmission method, the method including:
receiving a visible light communication signal, the visible light communication signal representing wireless energy transmission intensity between a wireless energy sending device and a wireless energy receiving device; and
performing wireless energy transmission on the wireless energy receiving device according to the visible light communication signal.

In a further aspect, an example embodiment of the present application provides a wireless energy receiving device, the device including:
a signal generation module, used to generate a visible light communication signal according to wireless energy transmission intensity between a wireless energy sending device and the wireless energy receiving device; and
a sending module, used to send the visible light communication signal.

In yet another aspect, an example embodiment of the present application provides a wireless energy sending device, the device including:
a receiving module, used to receive a visible light communication signal, the visible light communication signal representing wireless energy transmission intensity between the wireless energy sending device and a wireless energy receiving device; and
a wireless energy transmission module, used to perform wireless energy transmission on the wireless energy receiving device according to the visible light communication signal.

The methods and devices in the embodiments of the present application can transmit a signal related to wireless energy transmission intensity through visible light communication, to enable a user to easily obtain information about wireless energy transmission intensity.

The foregoing content of the application is provided for purposes of introducing some concepts to be further described in the following DETAILED DESCRIPTION in a simplified form. The content of the present application is neither intended to identify key features or essential features of the claimed subject matter nor intended to be used to help determine the scope of the claimed subject matter. In addition, the claimed subject matter is not limited to implementation of solving any or all technical problems mentioned in any part of the present application.

DETAILED DESCRIPTION

Figure 1:
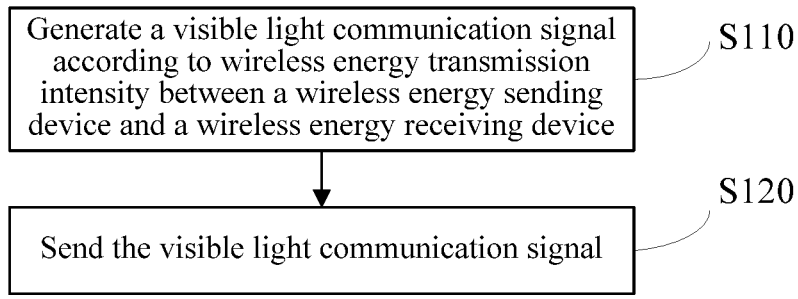
FIG. 1 is an example flowchart of steps of a wireless energy transmission method in an example embodiment of the present application.

Various embodiments of the present application are described in detail hereinafter with reference to the accompanying drawings (the same reference numerals in several drawings indicate the same elements) and embodiments. The following embodiments are intended to describe the present application, but not to limit the scope of the present application.

Those skilled in the art should understand that, the terms such as "first" and "second" in the present application are only used to distinguish different steps, devices or modules, and neither represent any specific technical meaning nor represent a necessary logical order between them.

During wireless energy transmission, wireless energy transmission intensity and other information are generally transmitted through a communication link between a wireless energy sending device and a wireless energy receiving device, but the information is not directly visible to a user. The embodiments of the present application provide a wireless energy transmission technology, which uses a visible light communication signal to represent wireless energy transmission intensity between a wireless energy sending device and a wireless energy receiving device, to enable a user to easily obtain information about wireless energy transmission intensity.

As shown in FIG. 1, an example embodiment of the present application provides a wireless energy transmission method, and the method may be implemented at an end of a wireless energy receiving device. The method includes:

Step 110: Generate a visible light communication signal according to wireless energy transmission intensity between a wireless energy sending device and a wireless energy receiving device.

Step 120: Send the visible light communication signal.

Functions of the steps in the wireless energy transmission method are described below with reference to FIG. 1.

Step 110: Generate a visible light communication signal according to wireless energy transmission intensity between a wireless energy sending device and a wireless energy receiving device.

In various implementations of the present application, wireless energy transmission intensity is used to represent energy obtained by a wireless energy receiving device per unit time, and those skilled in the art can determine the wireless energy transmission intensity by monitoring a charging current, a charging voltage, charging power or a battery level change speed of the wireless energy receiving device.

Figure 2:
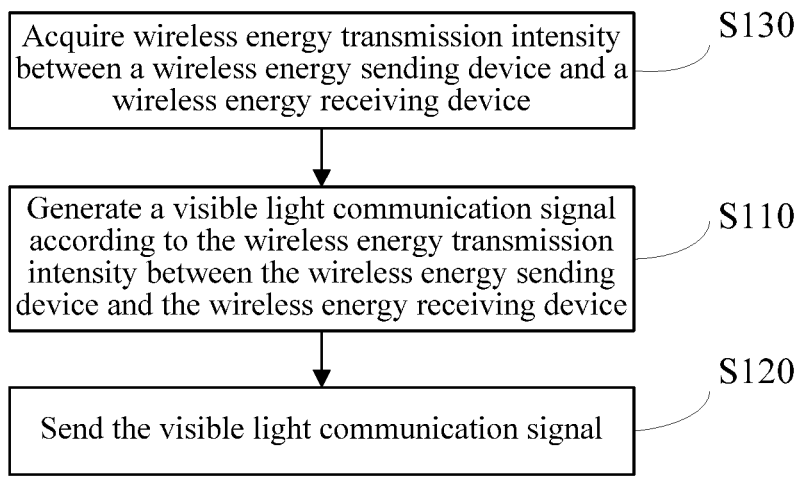
FIG. 2 is an example flowchart of steps of a wireless energy transmission method in another example embodiment of the present application.

In an example embodiment, as shown in FIG. 2, the wireless energy transmission method may further include Step 130: Acquire the wireless energy transmission intensity between the wireless energy sending device and the wireless energy receiving device. In different implementations of the present application, the wireless energy transmission intensity may be monitored and directly acquired by the wireless energy receiving device, or the wireless energy transmission intensity may be monitored and obtained by an independent device independent of the wireless energy transmission device, and then the wireless energy transmission intensity is acquired from the independent device. In the present application, monitoring manners and specific manifestations of the wireless energy transmission intensity can be determined by those skilled in the art according to actual demands.

In a specific embodiment of Step 110, the visible light communication signal may be generated based on a corresponding relationship between wireless energy transmission intensity and a visible light communication signal. The visible light communication signal in specific implementation of the present application may be expressed as multiple forms of visible light signals.

Figure 3:
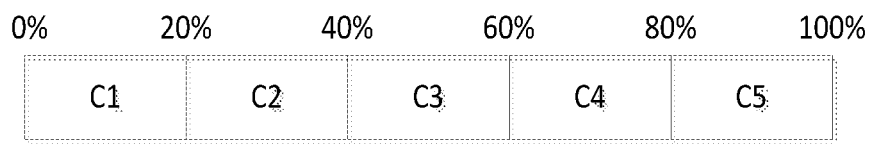
FIG. 3 is an example schematic view of a corresponding relationship between wireless energy transmission intensity and a visible light communication signal in an embodiment of the present application.
Figure 4:
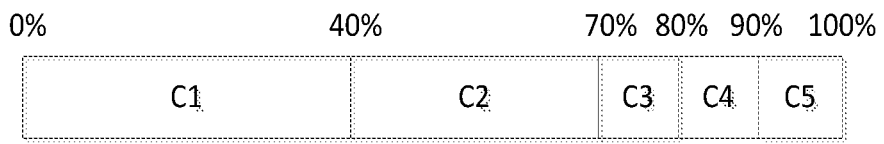
FIG. 4 is another example schematic view of a corresponding relationship between wireless energy transmission intensity and a visible light communication signal according to the present application.

For example, the visible light communication signal may include light signals in different colors, and in this case, the different colors may be used to distinguish and represent different levels of wireless energy transmission intensity. FIG. 3 shows a corresponding relationship between wireless energy transmission intensity and light signals in different colors. In FIG. 3, dimensions and units of wireless energy transmission intensity are omitted, and only a percentage is used to represent a level of wireless energy transmission intensity, where 0% represents the minimum value of wireless energy transmission intensity, and 100% represents the maximum value of wireless energy transmission intensity. Meanwhile, in FIG. 3, C1 to C5 respectively indicate five different colors. As shown in FIG. 3, in the corresponding relationship, the color C1 corresponds to a value of wireless energy transmission intensity between 0% to 20%; the color C2 corresponds to a value of wireless energy transmission intensity between 20% to 40%; the color C3 corresponds to a value of wireless energy transmission intensity between 40% to 60%; the color C4 corresponds to a value of wireless energy transmission intensity between 60% to 80%; and the color C5 corresponds to a value of wireless energy transmission intensity between 80% to 100%. Therefore, according to the corresponding relationship shown in FIG. 3, for example, if current wireless energy transmission intensity between a wireless energy sending device and a wireless energy receiving device is 50%, in Step 110, a visible light communication signal whose color is C3 is generated correspondingly. Those skilled in the art should understand that the corresponding relationship may be preset according to actual demands and may be adjusted correspondingly; for example, as shown in FIG. 4, a corresponding relationship between wireless energy transmission intensity and a visible light communication signal is partially adjusted relative to FIG. 3.

Figure 5:
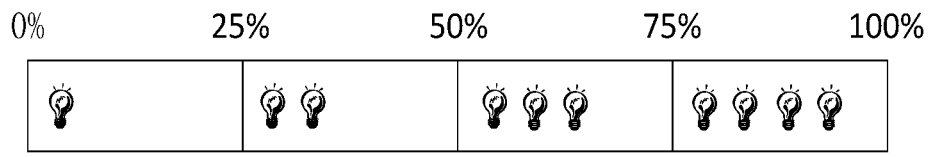
FIG. 5 is a further example schematic view of a corresponding relationship between wireless energy transmission intensity and a visible light communication signal according to the present application.

For another example, the visible light communication signal may include different numbers of light signals, and in this case, the different numbers may be used to distinguish and represent different levels of wireless energy transmission intensity. FIG. 5 shows a corresponding relationship between wireless energy transmission intensity and different numbers of light signals. In FIG. 5, dimensions and units of wireless energy transmission intensity are also omitted, and only a percentage is used to represent a level of wireless energy transmission intensity. Meanwhile, different numbers of light source icons "" represent different numbers of light signals. As shown in FIG. 5, in the corresponding relationship, one light signal corresponds to a value of wireless energy transmission intensity between 0% to 25%; two light signals correspond to a value of wireless energy transmission intensity between 25% to 50%; three light signals correspond to a value of wireless energy transmission intensity between 50% to 75%; and four light signals correspond to a value of wireless energy transmission intensity between 75% to 100%. Therefore, according to the corresponding relationship shown in FIG. 5, for example, if current wireless energy transmission intensity between a wireless energy sending device and a wireless energy receiving device is 60%, in Step 110, a visible light communication signal including three light signals is generated correspondingly. Those skilled in the art should understand that the corresponding relationship may also be preset according to actual demands and may be adjusted correspondingly.

Figure 6:
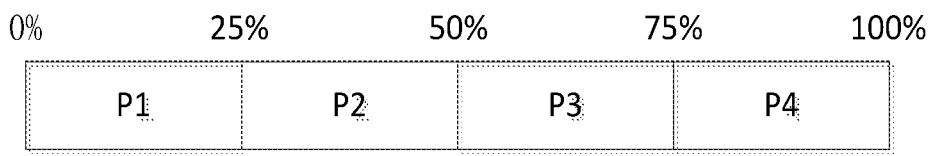
FIG. 6 is yet another example schematic view of a corresponding relationship between wireless energy transmission intensity and a visible light communication signal according to the present application.

For another example, the visible light communication signal may include light signals in different flickering modes, and in this case, the different flickering modes may be used to distinguish and represent different levels of wireless energy transmission intensity. Generally, flickering is an unsteady light signal that varies in some way, in this case, according to different ways or modes. The different flickering modes may perform distinguishing by using a flickering frequency of one light source, or may perform distinguishing by using the number or sequence of flickering of multiple light sources, and the like. FIG. 6 shows a corresponding relationship between wireless energy transmission intensity and light signals in different flickering modes. In FIG. 6, dimensions and units of the wireless energy transmission intensity are also omitted, and only a percentage is used to represent a level of wireless energy transmission intensity. Meanwhile, in FIG. 6, P1 to P4 respectively indicate four different flickering modes. As shown in FIG. 6, in the corresponding relationship, the flickering mode P1 corresponds to a value of wireless energy transmission intensity between 0% to 25%; the flickering mode P2 corresponds to a value of wireless energy transmission intensity between 25% to 50%; the flickering mode P3 corresponds to a value of wireless energy transmission intensity between 50% to 75%; and the flickering mode P4 corresponds to a value of wireless energy transmission intensity between 75% to 100%. Therefore, according to the corresponding relationship shown in FIG. 6, for example, if current wireless energy transmission intensity between a wireless energy sending device and a wireless energy receiving device is 60%, in Step 110, a visible light communication signal in a flickering mode P3 is generated correspondingly. Those skilled in the art should understand that the corresponding relationship may also be preset according to actual demands and may be adjusted correspondingly.

Step 120: Send the visible light communication signal.

In Step 120, the wireless energy receiving device may send the visible light communication signal generated in Step 110 to the wireless energy sending device.

In a specific embodiment, Step 120 may be implemented by a light-emitting unit in the wireless energy receiving device, and the light-emitting unit may send the generated visible light communication signal in a form of visible light. The light-emitting unit may include at least one light emitting diode (LED).

Specifically, when the visible light communication signal includes light signals in different colors, the light-emitting unit may include multiple LEDs in different colors or at least one multi-color LED. According to levels of wireless energy transmission intensity and a preset corresponding relationship (for example, the corresponding relationship shown in FIG. 3 or FIG. 4), the light-emitting unit sends the visible light communication signal through LEDs in corresponding colors, thus indicating different levels of wireless energy transmission intensity between a wireless energy sending device and a wireless energy receiving device. When the visible light communication signal includes different numbers of light signals, the light-emitting unit may include multiple LEDs. According to levels of wireless energy transmission intensity and a preset corresponding relationship (for example, the corresponding relationship shown in FIG. 5), the light-emitting unit sends the visible light communication signal through a corresponding number of LEDs, thus indicating different levels of wireless energy transmission intensity between a wireless energy sending device and a wireless energy receiving device. When the visible light communication signal includes light signals in different flickering modes, according to types of the flickering modes, the light-emitting unit may include one or more LEDs. According to levels of wireless energy transmission intensity and a preset corresponding relationship (for example, the corresponding relationship shown in FIG. 6), the light-emitting unit sends the visible light communication signal through LEDs in different flickering modes, thus indicating different levels of wireless energy transmission intensity between a wireless energy sending device and a wireless energy receiving device.

In addition, the embodiment of the present application further provides a computer-readable medium, including a computer-readable instruction for performing the following operations when being executed: executing all or a part of the step operations in the method shown in FIG. 1 or FIG. 2.

In view of the above, the method in the example embodiment may generate and send a signal related to wireless energy transmission intensity through visible light communication, to enable a user to easily obtain information about wireless energy transmission intensity. In addition, the manner of visible light communication reduces a device cost without setting a conventional communication unit at the wireless energy receiving device.

Figure 7:
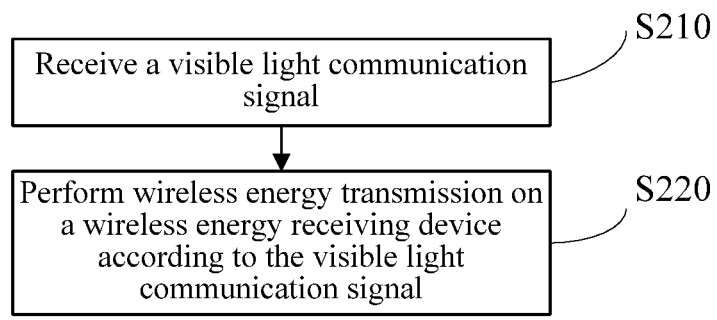
FIG. 7 is an example flowchart of steps of a wireless energy transmission method in another example embodiment of the present application.

As shown in FIG. 7, another example embodiment of the present application provides a wireless energy transmission method, and the method may be implemented at an end of a wireless energy sending device. The method includes:

Step 210: Receive a visible light communication signal, the visible light communication signal representing wireless energy transmission intensity between a wireless energy sending device and a wireless energy receiving device.

Step 220: Perform wireless energy transmission on the wireless energy receiving device according to the visible light communication signal.

Functions of the steps in the wireless energy transmission method are described below with reference to FIG. 7.

Step 210: Receive a visible light communication signal, the visible light communication signal representing wireless energy transmission intensity between a wireless energy sending device and a wireless energy receiving device.

The visible light communication signal received in Step 210 corresponds to the visible light communication signal generated in Step 110 and sent in Step 120 of the wireless energy transmission method in the previous example embodiment of the present application, and the visible light communication signal may represent wireless energy transmission intensity between a wireless energy sending device and a wireless energy receiving device.

Specifically, as information related to wireless energy transmission intensity is transmitted through visible light communication, in Step 210, the visible light communication signal sent by the end of the wireless energy receiving device may be received by using a light sensor.

The visible light communication signal may be expressed as multiple forms of visible light signals, all of which may be received by the light sensor. Similar to the previous example embodiment, the visible light communication signal may include light signals in different colors, and in this case, the different colors may be used to distinguish and represent different levels of wireless energy transmission intensity. The visible light communication signal may include different numbers of light signals, and in this case, the different numbers may be used to distinguish and represent different levels of wireless energy transmission intensity. The visible light communication signal may include light signals in different flickering modes, and in this case, the different flickering modes may be used to distinguish and represent different levels of wireless energy transmission intensity.

Step 220: Perform wireless energy transmission on the wireless energy receiving device according to the visible light communication signal.

Figure 8:
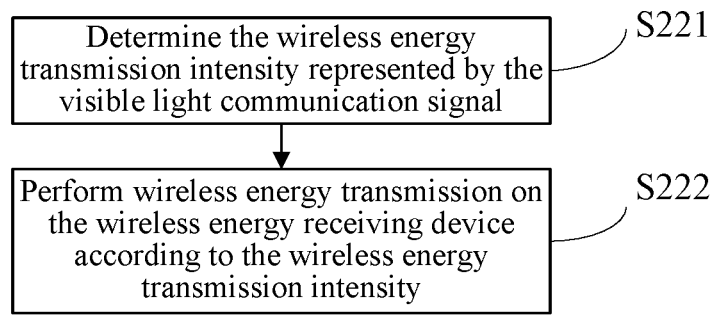
FIG. 8 is an example specific step flowchart of Step 220 in another example embodiment of the present application.

As shown in FIG. 8, Step 220 may further include:

Step 221: Determine the wireless energy transmission intensity represented by the visible light communication signal.

Step 222: Perform wireless energy transmission on the wireless energy receiving device according to the wireless energy transmission intensity.

In Step 221, the wireless energy transmission intensity represented by the visible light communication signal received in Step 210 may be determined based on a corresponding relationship between wireless energy transmission intensity and a visible light communication signal. Specifically, the corresponding relationship may be the same as the corresponding relationship (for example, a certain corresponding relationship shown in FIG. 3 to FIG. 6) based on which the visible light communication signal is generated according to the wireless energy transmission intensity in the previous example embodiment, and in this way, the wireless energy transmission intensity represented by the visible light communication signal determined in Step 221 is just the actual wireless energy transmission intensity between the wireless energy sending device and the wireless energy receiving device; or, the corresponding relationship may be different from the corresponding relationship based on which the visible light communication signal is generated according to the wireless energy transmission intensity in the previous example embodiment, especially in the case that a user defines a corresponding relationship at an end of a wireless energy receiving device, and in this way, it becomes possible for a user to flexibly set a device priority in a case of multiple wireless energy receiving devices.

Figure 9:
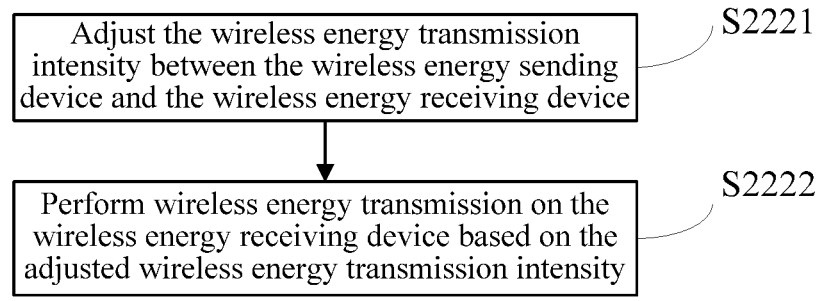
FIG. 9 is an example specific step flowchart of Step 222 in another example embodiment of the present application.

As shown in FIG. 9, Step 222 may further include:

Step 2221: Adjust the wireless energy transmission intensity between the wireless energy sending device and the wireless energy receiving device; and Step 2222: Perform wireless energy transmission on the wireless energy receiving device based on the adjusted wireless energy transmission intensity.

If the wireless energy transmission intensity determined through the received visible light communication signal can meet needs of wireless energy transmission, the wireless energy sending device may directly perform wireless energy transmission on the wireless energy receiving device based on the wireless energy transmission intensity. However, under many circumstances, at the beginning of establishing a wireless energy transmission link between the wireless energy sending device and the wireless energy receiving device, the wireless energy transmission link can be adjusted to improve wireless energy transmission intensity, so as to perform wireless energy transmission under better energy transmission conditions.

In Step 2221, the wireless energy transmission intensity between the wireless energy sending device and the wireless energy receiving device may be adjusted, and a specific adjustment manner may be determined according to a specific technology adopted for wireless energy transmission. For example, when magnetic resonance is adopted to perform wireless energy transmission, a resonance frequency of the wireless energy sending device may be adjusted to be identical with that of the wireless energy receiving device as much as possible, so as to achieve higher wireless energy transmission intensity. When microwave energy transmission is adopted to perform wireless energy transmission, phases of transmitters in a microwave array of the wireless energy sending device may be adjusted, so as to achieve higher wireless energy transmission intensity, and the like.

With continuous adjustment on the wireless energy sending device, adjusted wireless energy transmission intensity may be sent by the wireless energy receiving device through a visible light communication signal at any time and received by the wireless energy sending device. In Step 2222, the wireless energy sending device may perform wireless energy transmission on the wireless energy receiving device based on the adjusted wireless energy transmission intensity.

In addition, the embodiment of the present application further provides a computer-readable medium, including a computer-readable instruction for performing the following operations when being executed: executing all or a part of the step operations in the method shown in FIG. 7 to FIG. 9.

In view of the above, the method in the example embodiment can receive and process a signal related to wireless energy transmission intensity through visible light communication, to enable a user to easily obtain information about wireless energy transmission intensity. In addition, the manner of visible light communication reduces a device cost without setting a conventional communication unit at an end of the wireless energy sending device.

Those skilled in the art should understand that, in the methods of the implementations of the present application, sequence numbers of the steps do not mean an order of execution, the order of execution of the steps should be determined according to functions and internal logic thereof, but should not pose any limitation to implementation of the specific embodiments of the present application.

Figure 10:
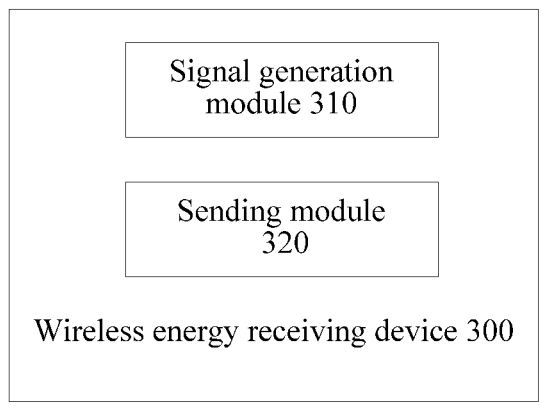
FIG. 10 is an example structural-functional view of a wireless energy receiving device in an example embodiment of the present application.

As shown in FIG. 10, an example embodiment of the present application provides a wireless energy receiving device 300, the device including:

A signal generation module 310 is used to generate a visible light communication signal according to wireless energy transmission intensity between a wireless energy sending device and the wireless energy receiving device.

A sending module 320 is used to send the visible light communication signal.

Functions of the modules in the wireless energy sending device are described below with reference to FIG. 10.

A signal generation module 310 is used to generate a visible light communication signal according to wireless energy transmission intensity between a wireless energy sending device and the wireless energy receiving device.

Figure 11:
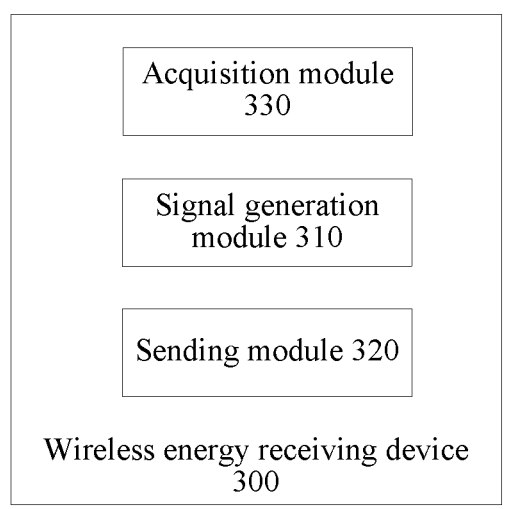
FIG. 11 is an example structural-functional view of a wireless energy receiving device in another example embodiment of the present application.

In an example embodiment, as shown in FIG. 11, the wireless energy sending device may further include an acquisition module 330, used to acquire the wireless energy transmission intensity between the wireless energy sending device and the wireless energy receiving device. In different implementations of the present application, the acquisition module 330 may directly monitor and acquire the wireless energy transmission intensity, and may also acquire the wireless energy transmission intensity from an independent device independent of the wireless energy transmission device.

In a specific embodiment, the signal generation module 310 may generate the visible light communication signal based on a corresponding relationship between wireless energy transmission intensity and a visible light communication signal. The visible light communication signal in the example embodiment of the present application may be expressed as multiple forms of visible light signals. For example, the visible light communication signal may include light signals in different colors, and in this case, the different colors may be used to distinguish and represent different levels of wireless energy transmission intensity. The visible light communication signal may include different numbers of light signals, and in this case, the different numbers may be used to distinguish and represent different levels of wireless energy transmission intensity. The visible light communication signal may include light signals in different flickering modes, and in this case, the different flickering modes may be used to distinguish and represent different levels of wireless energy transmission intensity.

A sending module 320 is used to send the visible light communication signal.

In a specific embodiment, the sending module 320 may be implemented by a light-emitting unit, and the light-emitting unit may send the generated visible light communication signal in a form of visible light. The light-emitting unit may include at least one LED.

In view of the above, the wireless energy receiving device in the example embodiment can generate and send a signal related to wireless energy transmission intensity through visible light communication, to enable a user to easily obtain information about wireless energy transmission intensity. In addition, the manner of visible light communication reduces a device cost without setting a conventional communication unit at an end of the wireless energy receiving device.

Figure 12:
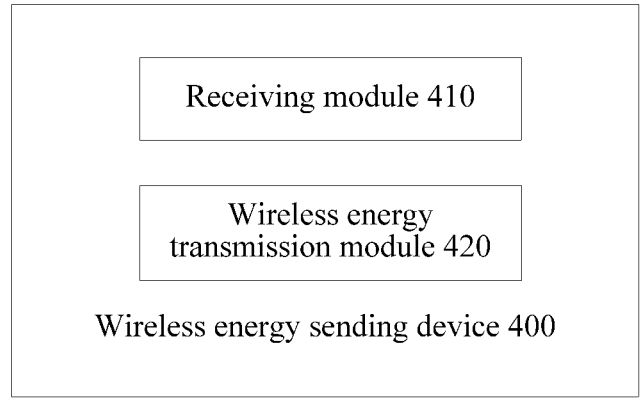
FIG. 12 is an example structural-functional view of a wireless energy sending device in an example embodiment of the present application.

As shown in FIG. 12, another example embodiment of the present application provides a wireless energy sending device 400, the device including:

A receiving module 410 is used to receive a visible light communication signal, the visible light communication signal representing wireless energy transmission intensity between the wireless energy sending device and a wireless energy receiving device.

A wireless energy transmission module 420 is used to perform wireless energy transmission on the wireless energy receiving device according to the visible light communication signal.

Functions of the modules in the wireless energy sending device are described below with reference to FIG. 12.

A receiving module 410 is used to receive a visible light communication signal, the visible light communication signal representing wireless energy transmission intensity between the wireless energy sending device and a wireless energy receiving device.

The visible light communication signal received by the receiving module 410 corresponds to the visible light communication signal generated by the signal generation module 310 and sent by the sending module 320 in the wireless energy sending device in the previous example embodiment of the present application, and the visible light communication signal may represent wireless energy transmission intensity between the wireless energy sending device and the wireless energy receiving device.

Specifically, the receiving module 410 may be implemented by a light sensor. The visible light communication signal may be expressed as multiple forms of visible light signals, all of which may be received by the light sensor.

A wireless energy transmission module 420 is used to perform wireless energy transmission on the wireless energy receiving device according to the visible light communication signal.

Figure 13:
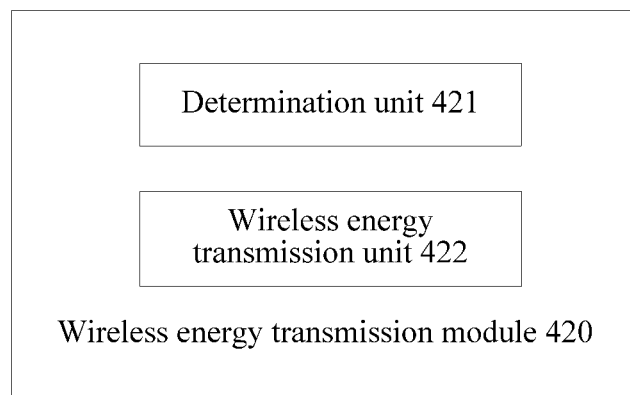
FIG. 13 is an example structural-functional view of a wireless energy transmission module in an example embodiment of the present application.

As shown in FIG. 13, the wireless energy transmission module 420 may further include:

A determination unit 421 is used to determine the wireless energy transmission intensity represented by the visible light communication signal.

A wireless energy transmission unit 422 is used to perform wireless energy transmission on the wireless energy receiving device according to the determined wireless energy transmission intensity.

The determination unit 421 may determine, based on a corresponding relationship between wireless energy transmission intensity and a visible light communication signal, the wireless energy transmission intensity represented by the visible light communication signal.

Figure 14:
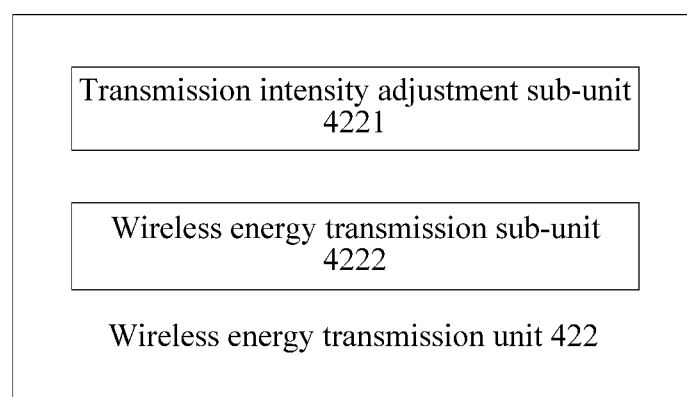
FIG. 14 is an example structural-functional view of a wireless energy transmission unit in an example embodiment of the present application.

As shown in FIG. 14, the wireless energy transmission unit 422 may further include:

a transmission intensity adjustment sub-unit 4221 used to adjust the wireless energy transmission intensity between the wireless energy sending device and the wireless energy receiving device.

The wireless energy transmission unit 422 can further include a wireless energy transmission sub-unit 4222 used to perform wireless energy transmission on the wireless energy receiving device based on the adjusted wireless energy transmission intensity.

The transmission intensity adjustment sub-unit 4221 may adjust the wireless energy transmission intensity between the wireless energy sending device and the wireless energy receiving device, and a specific adjustment manner may be determined according to a specific technology adopted for wireless energy transmission. The wireless energy transmission sub-unit 4222 may perform wireless energy transmission on the wireless energy receiving device based on the adjusted wireless energy transmission intensity.

In view of the above, the wireless energy sending device in the example embodiment can receive and process a signal related to wireless energy transmission intensity through visible light communication, to enable a user to easily obtain information about wireless energy transmission intensity. In addition, the manner of visible light communication reduces a device cost without setting a conventional communication unit at the wireless energy sending device.

Figure 15:
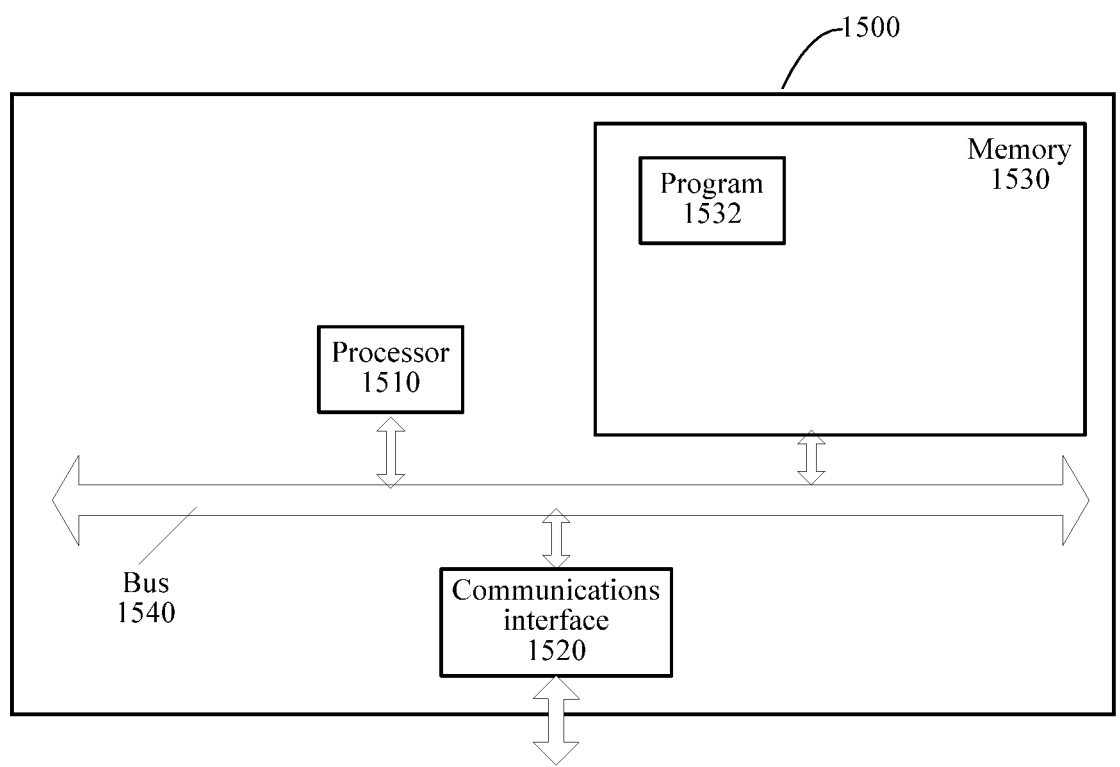
FIG. 15 is an example structural hardware view of a wireless energy receiving device in an example embodiment of the present application.

FIG. 15 is a schematic structural diagram of a wireless energy receiving device 1500 according to an embodiment of the present application, and the specific embodiment of the present application does not limit specific implementation of the wireless energy receiving device 1500. As shown in FIG. 15, the wireless energy receiving device 1500 may include:

a processor 1510, a communications interface 1520, a memory 1530, and a communications bus 1540.

The processor 1510, the communications interface 1520, and the memory 1530 accomplish mutual communications via the communications bus 1540.

The communications interface 1520 is used to communicate with a network element such as a client.

The processor 1510 is used to execute a program 1532, and specifically, can implement a part of or all functions of the wireless energy receiving device in the device embodiments shown in FIG. 10 and FIG. 11.

Specifically, the program 1532 may include a program code, the program code including a computer operation instruction.

The processor 1510 may be a central processing unit (CPU), or an application specific integrated circuit (ASIC), or be used to be one or more integrated circuits which implement the embodiments of the present application.

The memory 1530 is used to store the program 1532. The memory 1530 may include a high-speed RAM memory, and may also include a non-volatile memory, for example, at least one magnetic disk memory. The program 1532 may specifically implement a part of or all the following steps:

generating a visible light communication signal according to wireless energy transmission intensity between a wireless energy sending device and a wireless energy receiving device; and sending the visible light communication signal.

Reference can be made to the corresponding modules in the embodiments shown in FIG. 10 and FIG. 11 for specific implementation of each unit in the program 1532, which is not repeated herein.

Figure 16:
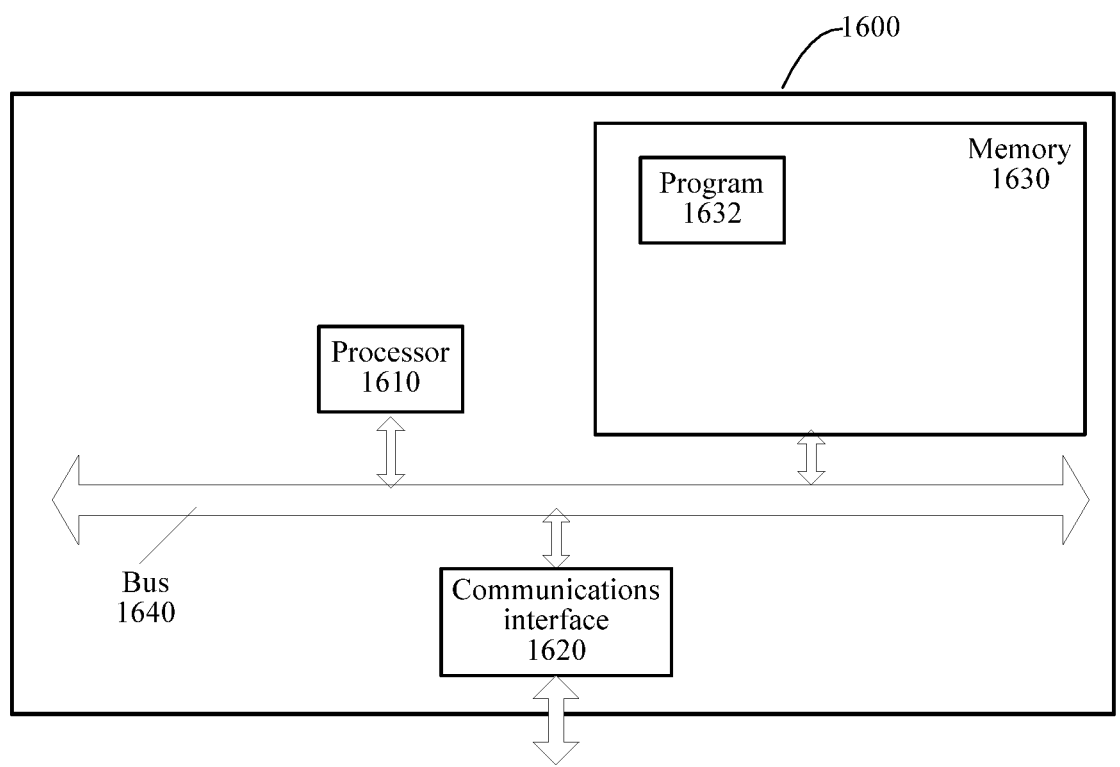
FIG. 16 is an example structural hardware view of a wireless energy sending device in an example embodiment of the present application.

FIG. 16 is a schematic structural diagram of a wireless energy sending device 1600 according to an embodiment of the present application, and the specific embodiment of the present application does not limit specific implementation of the wireless energy sending device 1600. As shown in FIG. 16, the wireless energy sending device 1600 may include:

a processor 1610, a communications interface 1620, a memory 1630, and a communications bus 1640.

The processor 1610, the communications interface 1620, and the memory 1630 accomplish mutual communications via the communications bus 1640.

The communications interface 1620 is used to communicate with a network element such as a client.

The processor 1610 is used to execute a program 1632, and specifically, can implement a part of or all functions of the wireless energy sending device in the device embodiments shown in FIG. 12 to FIG. 14.

Specifically, the program 1632 may include a program code, the program code including a computer operation instruction.

The processor 1610 may be a CPU, or an ASIC, or be used to be one or more integrated circuits which implement the embodiments of the present application.

The memory 1630 is used to store the program 1632. The memory 1630 may include a high-speed RAM memory, and may also include a non-volatile memory, for example, at least one magnetic disk memory. The program 1632 may specifically implement a part of or all the following steps:

receiving a visible light communication signal, the visible light communication signal representing wireless energy transmission intensity between a wireless energy sending device and a wireless energy receiving device; and performing wireless energy transmission on the wireless energy receiving device according to the visible light communication signal.

Reference can be made to the corresponding modules in the embodiments shown in FIG. 12 to FIG. 14 for specific implementation of each unit in the program 1632, which is not repeated herein.

Those skilled in the art can clearly understand that, reference can be made to the corresponding description in the foregoing apparatus embodiments for the devices described above and the specific working procedures of the modules, and will not be repeated herein in order to make the description convenient and concise.

Although the subject matter described herein is provided in a general context executed in combination with execution of an operating system and applications on a computer system, those skilled in the art may realize that other implementations may also be executed in combination with other types of program modules. Generally, the program modules include routines, programs, components, data structures and other types of structures executing particular tasks or implement particular abstract data types. Those skilled in the art can understand that, the subject matter described herein may be practiced with other computer system configurations, including handheld devices, multiprocessor systems, microprocessor-based or programmable consumer electronic products, minicomputers, mainframe computers, and the like, and may also be used in a distributed computing environment in which tasks are executed by remote processing devices connected via a communication network. In the distributed computing environment, the program modules may be located in both local and remote memory storage devices.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and includes several instructions for enabling a computer apparatus (which can be a personal computer, a server, or a network apparatus, and the like) to execute all or some steps of the method described in each embodiment of the present application. The foregoing computer-readable storage medium includes physical volatile and non-volatile, removable and non-removable media implemented in any manner or technology of storing information such as computer-readable instructions, data structures, program modules or other data. The computer-readable storage medium specifically includes, but is not limited to, a USB disk, a removable hard disk, a read-only memory (ROM), a random access memory (RAM), an erasable programmable read-only memory (EPROM), an electrically erasable programmable read-only memory (EEPROM), a flash memory or another solid state memory technology, a CD-ROM, a digital versatile disk (DVD), an HD-DVD, a Blue-Ray or other light storage devices, magnetic tape, magnetic disk storage or other magnetic storage devices, or any other media that can be used to store required information and can be accessed by a computer.

The above implementations are only used to describe the present application rather than to limit the present application; various changes and variations can be made by those of ordinary skill in the art without departing from the spirit and scope of the present application, so all equivalent technical solutions also belong to the scope of the present application, and the scope of patent protection of the present application should be as defined by the claims.

What is claimed is:

1. A method for wireless energy transmission between a wireless energy sending device and a wireless energy receiving device, comprising:
    generating, by the wireless energy receiving device, a visible light communication signal according to a wireless energy transmission intensity between the wireless energy sending device and the wireless energy receiving device, wherein the visible light communication signal is used to distinguish and represent different levels of wireless energy transmission intensity, and wherein the wireless energy transmission intensity is monitored and obtained by an independent device independent of the wireless energy sending device and the wireless energy receiving device; and
    sending, by a light-emitting unit of the wireless energy receiving device, the visible light communication signal to the wireless energy sending device,
    wherein the generating, by the wireless energy receiving device, the visible light communication signal comprises:
        generating, by the wireless energy receiving device, the visible light communication signal based on a corresponding relationship between the wireless energy transmission intensity and the visible light communication signal,
        wherein the visible light communication signal comprises different visible light signals that indicate different ranges of the wireless energy transmission intensity, and
        wherein the wireless energy transmission intensity represents energy obtained by the wireless energy receiving device per unit time.

2. The method of claim 1, further comprising:
    acquiring the wireless energy transmission intensity between the wireless energy sending device and the wireless energy receiving device.

3. The method of claim 1, wherein the visible light communication signal comprises light signals in different colors, the different colors being used to represent the different levels of wireless energy transmission intensity.

4. The method of claim 1, wherein the visible light communication signal comprises different numbers of light signals, the different numbers being used to represent the different levels of wireless energy transmission intensity.

5. The method of claim 1, wherein the visible light communication signal comprises light signals in different flickering modes, the different flickering modes being used to represent the different levels of wireless energy transmission intensity.

6. The method of claim 1, wherein the light-emitting unit comprises at least one light emitting diode (LED).

7. A method for wireless energy transmission between a wireless energy sending device and a wireless energy receiving device, comprising:
    receiving, by a light sensor of the wireless energy sending device, a visible light communication signal, the visible light communication signal representing a wireless energy transmission intensity between the wireless energy sending device and the wireless energy receiving device, and wherein the visible light communication signal is used to distinguish and represent different levels of wireless energy transmission intensity, and wherein the wireless energy transmission intensity is monitored and obtained by an independent device independent of the wireless energy sending device and the wireless energy receiving device; and
    transmitting, by the wireless energy sending device, wireless energy to the wireless energy receiving device according to the visible light communication signal,
    wherein the transmitting the wireless energy to the wireless energy receiving device according to the visible light communication signal comprises:
        determining, by the wireless energy sending device, the wireless energy transmission intensity represented by the visible light communication signal, and
        transmitting, by the wireless energy sending device, the wireless energy to the wireless energy receiving device according to the wireless energy transmission intensity, and
    wherein the determining, by the wireless energy sending device, the wireless energy transmission intensity represented by the visible light communication signal comprises:
        determining, by the wireless energy sending device, based on a corresponding relationship between the wireless energy transmission intensity and the visible light communication signal, the wireless energy transmission intensity represented by the visible light communication signal,
        wherein the visible light communication signal comprises different visible light signals that indicate different ranges of the wireless energy transmission intensity,
        wherein the wireless energy transmission intensity represents energy obtained by the wireless energy receiving device per unit time.

8. The method of claim 7, wherein the visible light communication signal comprises light signals in different colors, the different colors being used to represent the different levels of wireless energy transmission intensity.

9. The method of claim 7, wherein the visible light communication signal comprises different numbers of light signals, the different numbers being used to represent the different levels of wireless energy transmission intensity.

10. The method of claim 7, wherein the visible light communication signal comprises light signals in different flickering modes, the different flickering modes being used to represent the different levels of wireless energy transmission intensity.

11. The method of claim 7, wherein the transmitting, by the wireless energy sending device, the wireless energy to the wireless energy receiving device according to the wireless energy transmission intensity comprises:

adjusting, by the wireless energy sending device, the wireless energy transmission intensity between the wireless energy sending device and the wireless energy receiving device, resulting in an adjusted wireless energy transmission intensity; and transmitting, by the wireless energy sending device, the wireless energy to the wireless energy receiving device based on the adjusted wireless energy transmission intensity.

12. The method of claim 7, wherein different colors of the visible light communication signal respectively correspond to different ranges of values of the wireless energy transmission intensity, wherein the visible light communication signal comprising a first color of the different colors corresponds to a first value of the wireless energy transmission intensity being in a first range of the different ranges, wherein the visible light communication signal comprising a second color of the different colors corresponds to a second value of the wireless energy transmission intensity being in a second range of the different ranges, and wherein the second range of the different ranges comprises higher values than the first range.

13. The method of claim 7, wherein the visible light communication signal comprises a number of visible light communication signals corresponding to a value of the wireless energy transmission intensity, wherein the number being one corresponds to the value of the wireless energy transmission intensity being a first intensity value in a first value range, wherein the number being two corresponds to the value of the wireless energy transmission intensity being a second intensity value in a second value range, and wherein the second value range comprises greater values than the first value range.

14. The method of claim 7, wherein the visible light communication signal includes light signals in different flickering modes, wherein the different flickering modes comprise at least a flickering frequency of at least one light source, wherein the flickering frequency of the at least one light source corresponds to a respective range of values of wireless energy transmission intensity, wherein a first flickering frequency of the at least one light source corresponds to a first value of the wireless energy transmission intensity that is in a first range of the respective range of values of wireless energy transmission intensity, wherein a second flickering frequency of the at least one light source corresponds to a second value of the wireless energy transmission intensity of a second range of the respective range of values of wireless energy transmission intensity, and wherein the second range comprises values greater than the first range.

15. A wireless energy receiving device, comprising:

a memory, coupled to a processor, that stores executable modules, the executable modules comprising:

a signal generation module that generates a visible light communication signal according to a wireless energy transmission intensity between a wireless energy sending device and the wireless energy receiving device, and based on a corresponding relationship between the wireless energy transmission intensity and the visible light communication signal, wherein the visible light communication signal is used to distinguish and represent different levels of wireless energy transmission intensity, and wherein the wireless energy transmission intensity is monitored and obtained by an independent device independent of the wireless energy sending device and the wireless energy receiving device; and a sending module that sends, via a light-emitting unit of the wireless energy receiving device, the visible light communication signal to the wireless energy sending device, wherein the visible light communication signal comprises different visible light signals that indicate different ranges of the wireless energy transmission intensity, and wherein the wireless energy transmission intensity represents energy obtained by the wireless energy receiving device per unit time.

16. The wireless energy receiving device of claim 15, wherein the executable modules further comprise:

an acquisition module that acquires the wireless energy transmission intensity between the wireless energy sending device and the wireless energy receiving device.

17. The wireless energy receiving device of claim 15, wherein the light-emitting unit comprises at least one light emitting diode (LED).

18. The wireless energy receiving device of claim 15, wherein the visible light communication signal generated by the signal generation module comprises at least one of different colors, different visible light communication signal parts, or different light flickering frequencies, and wherein the at least one of the different colors, the different visible light communication signal parts, or the different light flickering frequencies respectively correspond to different ranges of values of the wireless energy transmission intensity.

19. A wireless energy sending device, comprising:

a processor, coupled to a memory, that executes or facilitates execution of executable modules, the executable modules comprising:

a receiving module that receives, via a light sensor in the wireless energy sending device, a visible light communication signal, the visible light communication signal representing a wireless energy transmission intensity between the wireless energy sending device and a wireless energy receiving device, and wherein the visible light communication signal is used to distinguish and represent different levels of wireless energy transmission intensity, and wherein the wireless energy transmission intensity is monitored and obtained by an independent device independent of the wireless energy sending device and the wireless energy receiving device; and a wireless energy transmission module that transmits-wireless energy to the wireless energy receiving device according to the visible light communication signal, wherein the wireless energy transmission module comprises:

a determination unit that determines, based on a preset corresponding relationship between the wireless energy transmission intensity and the visible light communication signal, the wireless energy transmission intensity represented by the visible light communication signal, and a wireless energy transmission unit that transmits the wireless energy to the wireless energy receiving device according to the wireless energy transmission intensity, wherein the visible light communication signal comprises different visible light signals that indicate different ranges of the wireless energy transmission intensity, and wherein the wireless energy transmission intensity represents energy obtained by the wireless energy receiving device per unit time.

20. The wireless energy sending device of claim 19, wherein the wireless energy transmission unit comprises:

a transmission intensity adjustment sub-unit that adjusts the wireless energy transmission intensity between the wireless energy sending device and the wireless energy receiving device resulting in an adjusted wireless energy transmission intensity; and a wireless energy transmission sub-unit that transmits the wireless energy to the wireless energy receiving device based on the adjusted wireless energy transmission intensity.

21. A computer readable storage device comprising executable instructions that, in response to execution, cause a wireless energy receiving device comprising a processor to perform operations, comprising:

based on a wireless energy transmission intensity between a wireless energy sending device and the wireless energy receiving device and based on a defined relationship between the wireless energy transmission intensity and a visible light communication signal, generating the visible light communication signal, wherein the visible light communication signal is used to distinguish and represent different levels of wireless energy transmission intensity, and wherein the wireless energy transmission intensity is monitored and obtained by an independent device independent of the wireless energy sending device and the wireless energy receiving device; and sending, by a light-emitting unit in the wireless energy receiving device, the visible light communication signal to the wireless energy sending device, wherein the visible light communication signal comprises different visible light signals that indicate different ranges of the wireless energy transmission intensity, and wherein the wireless energy transmission intensity represents energy obtained by the wireless energy receiving device per unit time.

22. The computer readable storage device of claim 21, wherein the operations further comprise:

acquiring the wireless energy transmission intensity between the wireless energy sending device and the wireless energy receiving device.

23. The computer readable storage device of claim 21, wherein the visible light communication signal comprises light signals in different colors, the different colors being used to represent the different levels of wireless energy transmission intensity.

24. The computer readable storage device of claim 21, wherein the visible light communication signal comprises different numbers of light signals, the different numbers being used to represent the different levels of wireless energy transmission intensity.

25. A computer readable storage device comprising executable instructions that, in response to execution, cause a wireless energy sending device comprising a processor to perform operations, comprising:

receiving, by a light sensor of the wireless energy sending device, a visible light communication signal, the visible light communication signal representing a wireless energy transmission intensity between the wireless energy sending device and a wireless energy receiving device, and wherein the visible light communication signal is used to distinguish and represent different levels of wireless energy transmission intensity, and wherein the wireless energy transmission intensity is monitored and obtained by an independent device independent of the wireless energy sending device and the wireless energy receiving device; and transmitting wireless energy to the wireless energy receiving device according to the visible light communication signal, wherein the transmitting of the wireless energy to the wireless energy receiving device according to the visible light communication signal comprises:

determining the wireless energy transmission intensity represented by the visible light communication signal, and transmitting the wireless energy to the wireless energy receiving device according to the wireless energy transmission intensity, and wherein the determining the wireless energy transmission intensity represented by the visible light communication signal comprises:

determining, based on a corresponding relationship between the wireless energy transmission intensity and the visible light communication signal, the wireless energy transmission intensity represented by the visible light communication signal, wherein the visible light communication signal comprises different visible light signals that indicate different ranges of the wireless energy transmission intensity, and wherein the wireless energy transmission intensity represents energy obtained by the wireless energy receiving device per unit time.

26. The computer readable storage device of claim 25, wherein the visible light communication signal comprises light signals in different colors, the different colors being used to represent the different levels of wireless energy transmission intensity.

27. The computer readable storage device of claim 25, wherein the visible light communication signal comprises different numbers of light signals, the different numbers being used to represent the different levels of wireless energy transmission intensity.

28. The computer readable storage device of claim 25, wherein the visible light communication signal comprises light signals in different flickering modes, the different flickering modes being used to represent the different levels of wireless energy transmission intensity.

* * * * *